United States Patent
Stoletny et al.

(10) Patent No.: US 10,795,995 B1
(45) Date of Patent: *Oct. 6, 2020

(54) IDENTIFYING MALICIOUS CREATIVES TO SUPPLY SIDE PLATFORMS (SSP)

(71) Applicant: CLEAN.IO, INC., McLean, VA (US)

(72) Inventors: Alexey Stoletny, Long Island City, NY (US); Seth Demsey, Vienna, VA (US); Iván Soroka, Odessa (UA)

(73) Assignee: CLEAN.IO, INC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,013

(22) Filed: Apr. 23, 2020

Related U.S. Application Data

(63) Continuation of application No. 16/732,016, filed on Dec. 31, 2019, now Pat. No. 10,657,254.

(51) Int. Cl.
  *G06F 21/56* (2013.01)
  *G06F 21/54* (2013.01)

(52) U.S. Cl.
  CPC ............ *G06F 21/564* (2013.01); *G06F 21/54* (2013.01); *G06F 21/561* (2013.01); *G06F 21/568* (2013.01)

(58) Field of Classification Search
  CPC ...... G06F 21/564; G06F 21/54; G06F 21/561; G06F 21/568; G06Q 30/0275
  See application file for complete search history.

(56) References Cited

U.S. PATENT DOCUMENTS

| | | | |
|---|---|---|---|
| 8,516,590 B1* | 8/2013 | Ranadive | H04L 63/1483 726/24 |
| 8,997,228 B1* | 3/2015 | Satish | H04L 63/14 726/23 |
| 9,684,636 B2* | 6/2017 | Liang | G06F 40/205 |
| 10,205,749 B1* | 2/2019 | Sem Siev | H04L 63/1466 |
| 10,320,816 B1* | 6/2019 | Smith | G06Q 30/0277 |

(Continued)

OTHER PUBLICATIONS

IAB, Deconstructing the Anatomy of a Programmatic CPM, https://www.iab.com/wp-content/uploads/2016/03/Programmatic-Value-Layers-March-2016-FINALv2.pdf, Mar. 2016, pp. 1-9.*

(Continued)

*Primary Examiner* — Farid Homayounmehr
*Assistant Examiner* — Raied A Salman
(74) *Attorney, Agent, or Firm* — SoCal IP Law Group LLP; Angelo Gaz; Steven C. Sereboff

(57) ABSTRACT

There are disclosed devices, system and methods for feeding identification data of malicious creatives existing in internet advertisements to a supply side platform (SSP) by receiving reports of unwanted actions without user action by malicious creatives of internet advertisements (ads) requested from the SSP by webpages being displayed to users. The reports include a creative identification (ID), a malicious code chain of events, and a demand side platform (DSP) ID or a seat ID. The reports are pre-processed by classifying the unwanted action attempts based on the chain of events. The pre-processed reports are parsed to extract the creative IDs, the SSP IDs and the DSP IDs; and then stored in a searchable database. The stored parsed pre-processed reports are feed to SSPs based on the SSP identifications. The feed includes the creative IDs, the SSP IDs, the DSP IDs, timestamps of the unwanted action attempt and the classifications.

20 Claims, 7 Drawing Sheets

(56) References Cited

U.S. PATENT DOCUMENTS

| | | |
|---|---|---|
| 10,586,023 B2 | 3/2020 | Gould et al. |
| 2005/0015626 A1 | 1/2005 | Chasin |
| 2009/0281889 A1* | 11/2009 | Derosa-Grund ....... G06Q 30/00 705/14.25 |
| 2012/0047027 A1* | 2/2012 | Kadambi ........... G06Q 30/0277 705/14.73 |
| 2014/0129352 A1* | 5/2014 | Ringdahl ........... G06Q 30/0275 705/14.71 |
| 2014/0136338 A1* | 5/2014 | Ringdahl ........... G06Q 30/0273 705/14.71 |
| 2014/0136344 A1* | 5/2014 | Ringdahl ........... G06Q 30/0273 705/14.71 |
| 2015/0051968 A1* | 2/2015 | Sotelo ................ G06Q 30/0246 705/14.45 |
| 2015/0154650 A1* | 6/2015 | Umeda .................. G06Q 30/08 705/14.68 |
| 2015/0269200 A1 | 9/2015 | Beckhardt et al. |
| 2016/0078229 A1 | 3/2016 | Gong et al. |
| 2016/0094564 A1 | 3/2016 | Mohanfas et al. |
| 2016/0205115 A1 | 7/2016 | Kulkarni et al. |
| 2017/0018002 A1* | 1/2017 | Champy ........... H04N 21/41407 |
| 2017/0244748 A1 | 8/2017 | Krause et al. |
| 2017/0264619 A1 | 9/2017 | Narayanaswamy et al. |
| 2017/0308681 A1 | 10/2017 | Gould et al. |
| 2017/0323100 A1 | 11/2017 | Li et al. |
| 2018/0060914 A1 | 3/2018 | Conrad et al. |
| 2018/0124110 A1 | 5/2018 | Hunt et al. |
| 2018/0189824 A1* | 7/2018 | Yanamadala ...... G06Q 30/0277 |
| 2019/0141013 A1* | 5/2019 | Mail .................. G06Q 30/0241 |
| 2019/0318094 A1 | 10/2019 | Sun et al. |
| 2019/0386969 A1 | 12/2019 | Verzun et al. |
| 2020/0019702 A1* | 1/2020 | Tong ...................... G06F 21/56 |
| 2020/0053109 A1 | 2/2020 | Lancioni et al. |

OTHER PUBLICATIONS

Huxiao Liu, et al., An Illegal Billboard Advertisement Detection Framework Based on Machine Learning, ICBDT2019: Proceedings of the 2nd International Conference on Big Data Technologies, Aug. 2019, pp. 159-164.*

* cited by examiner

System 100

# IDENTIFYING MALICIOUS CREATIVES TO SUPPLY SIDE PLATFORMS (SSP)

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent is a continuation from co-pending patent application Ser. No. 16/732,016, filed Dec. 31, 2019, titled IDENTIFYING MALICIOUS CREATIVES TO SUPPLY SIDE PLATFORMS (SSP), which is incorporated herein by reference.

BACKGROUND

Field

This disclosure relates to identifying malicious creatives to supply side platforms (SSPs). The malicious creatives may be identified by extracting and feeding identification data of those creatives that exist in internet advertisements to the SSPs that provided them so that the SSPs can block those creative in the future.

Description of the Related Art

An Internet advertisement ("ad") is typically displayed in a certain area or space of a publisher's Internet webpage, such as a webpage of content for readers to see. The publisher may provide a certain ad space or call in their webpage content for a browser to download an internet ad from an advertiser or server. For example, a publisher may designate a slot (e.g., space, location or placement on their published webpage) and know how and when the ad unit runs. Typically, the ads have pixels that are typically images that load from somewhere (e.g., a party such as an advertiser or intermediary) and thereby signal that party they loaded from about a certain action (like an impression). Then, the loaded ads will typically have a link to click on to go to another webpage. In some cases, the link is a combination of the hyper-text markup language (HTML) tag for a link with the HTML tag for an image or video so that when users click on the link or ad, they are redirected from the publisher's webpage to the advertiser's website to make a purchase. The click on the advertisement activates a browser call to download a page from the associated advertiser's website that the browser can render (e.g. display) on the computing device.

However, the downloaded ads access to the computing device may not be secure because the ad may not be sufficiently vetted or reviewed to ensure it does not include malware (e.g., malicious code). This can be a problem, at least for the users because the ads themselves are a piece of HTML+JavaScript+cascading style sheets (CSS), which runs in the trusted scope of the user browsing session (often times having access to a first party domain which the user is viewing the ad from). This means that many ads, coming from anywhere, may actually has full access to what a user does, types or sees on the site because they have access to the first party domain, and malware in those ads can do a lot of damage, with redirects being one of the types of this kind of damage. Some ads will not have full access because they do not have access to the first party domain. Similar to an executable file from an untrusted party running on a user's computer (trusted environment), same thing happens with ads where this trust boundary is implicitly violated. Users do not realize that the ads on a website may have access to their shopping cart or details they enter on the site. Site owners do not want to let the ads do anything their site can accomplish, and they want to limit what the ad can do to only certain types of activities (e.g. define a policy). However, there is little control of that in the browser, and while some things can be set using browser sandbox attributes, cryptographic service provider (CSP), etc., to limit what the ad can do, this does not stop sophisticated malicious actors or malware.

And, increasingly, advertising networks or intermediaries have become targets of malware that, effectively, has open access to internet users. Consequently, there is a problem when an ad incorporates malicious code that may perform unwanted actions (such as non-user-initiated redirects), or forcing redirects to legitimate sites (e.g., so that the advertiser effectively gets a "100% click-through rate" and can make money on this). When this malware is rendered by the browser it exposes the user's computer to harmful unwanted actions such as unwanted data access, cryptocurrency mining, "trick" webpages that attempt to force users to do unwanted actions, or to the automatic or near-automatic downloading of unwanted applications, harmful content such as viruses, or unpaid for advertising images.

Thus, there is a need to detect this malware and/or unwanted actions on the publisher's webpage to give website owners greater control over third party Java Script code executed on their sites, which otherwise was not available. There is also a need to stop the intermediaries of the advertisements from sending the malware to the webpages to give the intermediaries greater control over third party Java Script code they distribute to the website owners, which otherwise was not available.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

There is a need to stop intermediaries that provide internet advertisements called for by webpages from sending malware to the webpages to give the intermediaries greater control over third party Java Script code they distribute to the webpage owners or publishers. This need can be accomplished by informing the intermediaries providing the advertisements that they are sending the malware so that they can discontinue sending the malware to the webpages.

For example, technologies described herein include systems and methods for extracting and feeding identification data of malicious creatives existing in internet advertisements ("ads") to ad providers or intermediaries so that they can stop sending the identified ads. The intermediaries may be brokers, distributors, supply side platforms (SSPs) and/or other providers of internet advertisements called for by webpages. The malware may be malicious code included in the advertisement or a creative of the advertisement. The system may include a user computing device that receives a publisher's webpage having ad space or a call for an internet ad which includes malicious code. The webpage may be a published webpage being displayed to a user that detects and reports attempted unwanted actions by having protection computer instructions or code that detects and sends malicious code reports of attempted unwanted actions by malicious creative existing in an internet ad promoting goods and/or services requested from a third party advertiser by the user's browser. The malicious code reports are received by a feeding computing device (e.g., server computer) having feeding computer instructions or code that feeds identification data to the SSPs for the malicious creatives existing in internet ads of those SSPs that are reported in the malicious code reports. The data fed to the SSPs identifies the malicious creatives and/or advertisements so that the SSPs can block these ads in the future. That is, based on knowing the identification data of the malicious creatives, the ad intermediaries or SSPs can block the identified malware advertisements or malicious creatives from being sent to the webpages to give the intermediaries greater control over third party Java Script code they distribute to the website owners.

Description of Apparatus

Figure 1A:
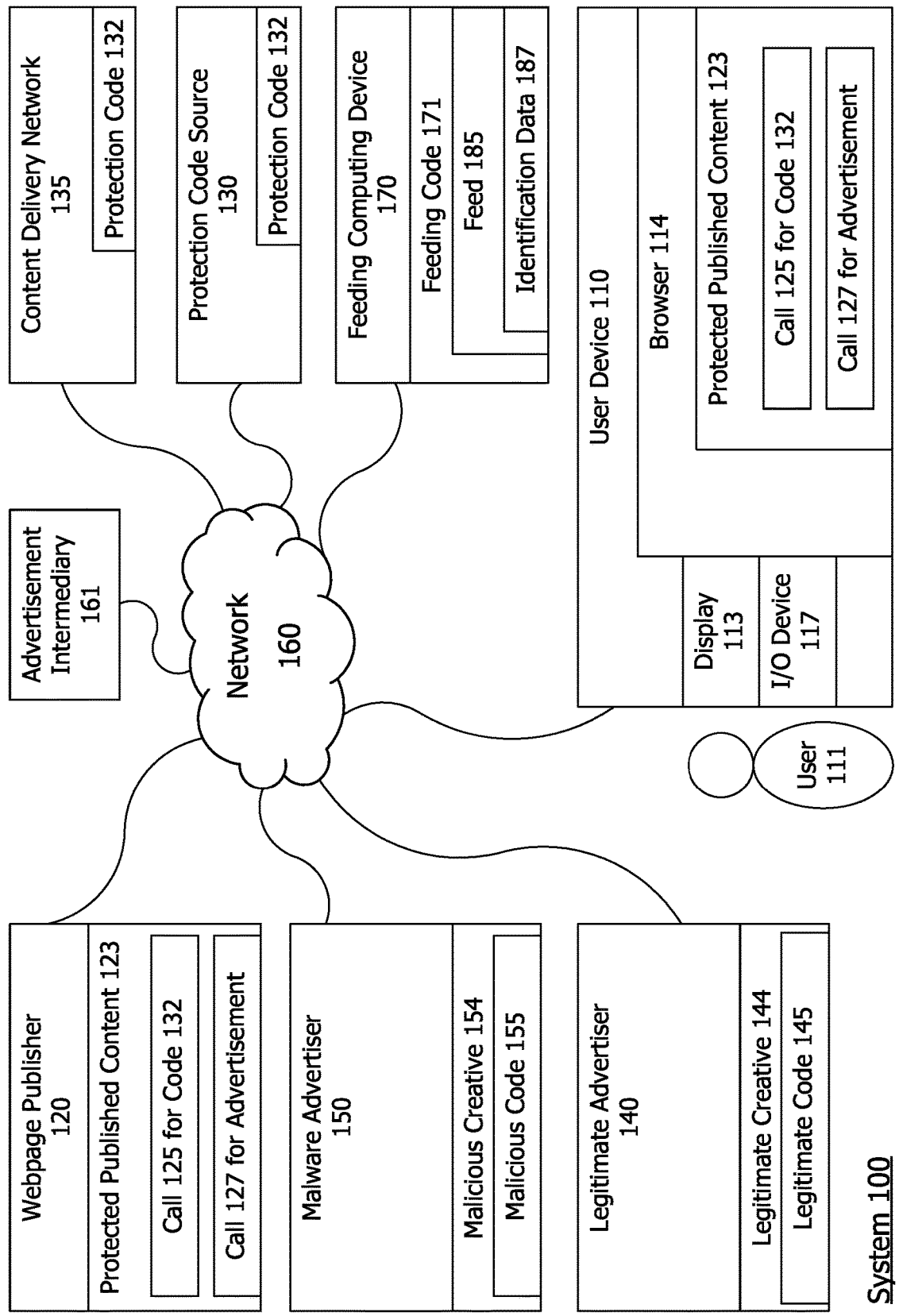
FIG. 1A is a diagram of system for extracting and feeding identification data of malicious creatives existing in internet advertisements to supply side platforms (SSPs).

Referring now to FIG. 1A, there is shown a system 100 for detecting, extracting and feeding identification data 187 to intermediary 161 for malicious creatives 155 existing in internet ads or creatives 154. Also, referring to FIG. 1B, there is shown a user device 110 executing a protected published webpage content 123 that has the ability to detect and report malicious creatives 154 existing in internet advertisements.

For a typical or legitimate internet advertisement such as legitimate creative 144, legitimate code 145 may be activated by a user's click (e.g., click with a mouse, keyboard key or touchscreen tap) to cause an instruction or command to be provided to a web browser, sandbox or similar web-based software, that instructs that software open a destination landing page. Legitimate code 145 may redirects in response to a user action and/or as intended by the user. This opening may access or request access to content (e.g., computer code to be rendered or downloaded) from a web location different from the one currently being viewed or accessed by that software. When activated, legitimate code 145 may be or cause a browser to perform a legitimate action such as an redirect, opening of a new window, opening of a browser tab, opening of an AppStore or opening of another application that the user intends to open. In this legitimate case, the activated legitimate code 145 may be the hypertext markup language link that activates in response to user interaction with an advertisement so as to direct a web browser to legitimate code. In this legitimate case, the downloaded content (e.g., code) can be the content to which an advertisement redirects a browser when a user clicks or otherwise interacts with that advertisement within a web page.

However, for malicious creatives 154, malicious code 155 automatically causes (e.g., without being activated by a user's click) an instruction or command to be provided to a web browser, sandbox or similar web-based software, that instructs that software open a destination landing page. Malicious code 155 may cause a redirect or an unwanted action 158 without a user action and/or that is not intended by the user. That is, the malicious code 155 causes a browser unwanted action that is opening of a landing page without action by the user 111. This opening may be or include harmful content 159. When creative 154 is executed, code 155 may be an instruction or command that automatically activates (e.g., without user 111 interaction, activation or action) as activated malicious code 157 that when provided to a web browser 114 or similar web-based software, instructs that software to perform an unwanted action 158, such as to request access to harmful content 159 at a web location different from the webpage currently being viewed or accessed by that browser. Malicious code 155 may automatically activate as activated malicious code 157 during or after the creative 155 is executed or rendered, which may be or cause a browser unwanted action 158 for harmful content 159. The browser unwanted action 158 may be an unwanted redirect, unwanted opening of a new window, unwanted opening of a browser tab, unwanted opening of an AppStore and/or unwanted opening of another application.

To prevent future instances of unwanted action 158, system 100 may detect, extract and feed identification data 187 to intermediary 161 for malicious code 155 existing in internet ads or creatives 154. The system 100 includes the following system components: the user device 110, the webpage publisher 120, the protection code source 130, the feeding (e.g., extracting and feeding) computing device 170 having executing feeding code 172, the legitimate advertiser 140, the malware advertiser 150 (e.g., having creative 154 with malicious code 155), the network 160 and the content delivery network (CDN) 135 having protection code 132.

Figure 5:
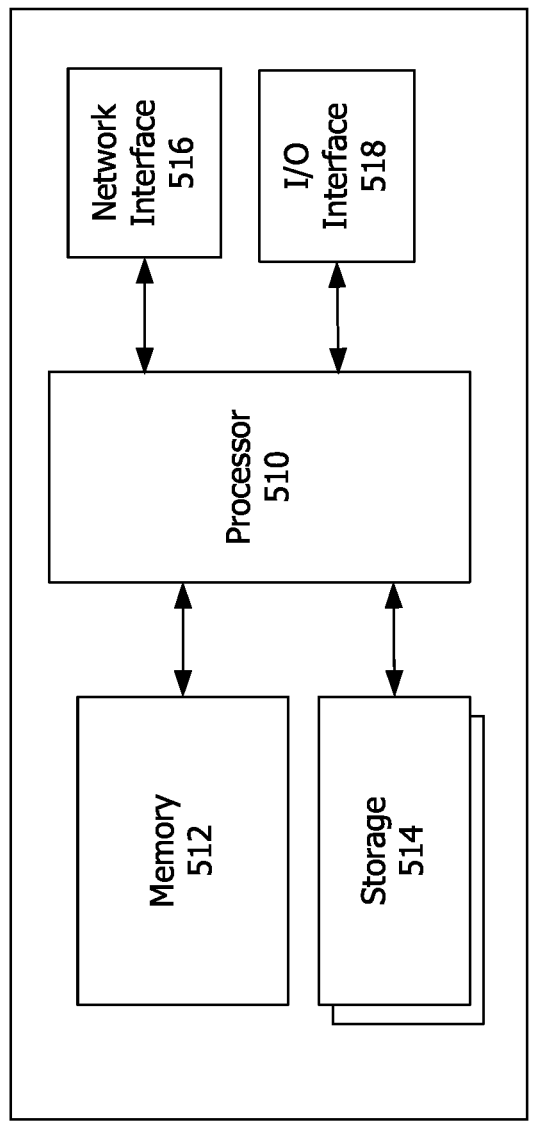
FIG. 5 is a block diagram of a computing device.

Each of the components may be or include at least one computing device such as computing device 500 of FIG. 5. Each of these computing devices is connected to the network 160 through a data connection as shown by the lines between each computing device and the network 160. Each computing device may communicate with and transfer data to any of the other computing devices through the network 160 and the data connections between those components. The system 100 may include additional components. For example, there may be numerous user devices 110, publishers 120, sources 130, advertisers 140, and/or advertiser 150 connected to the network 160.

Figure 1B:
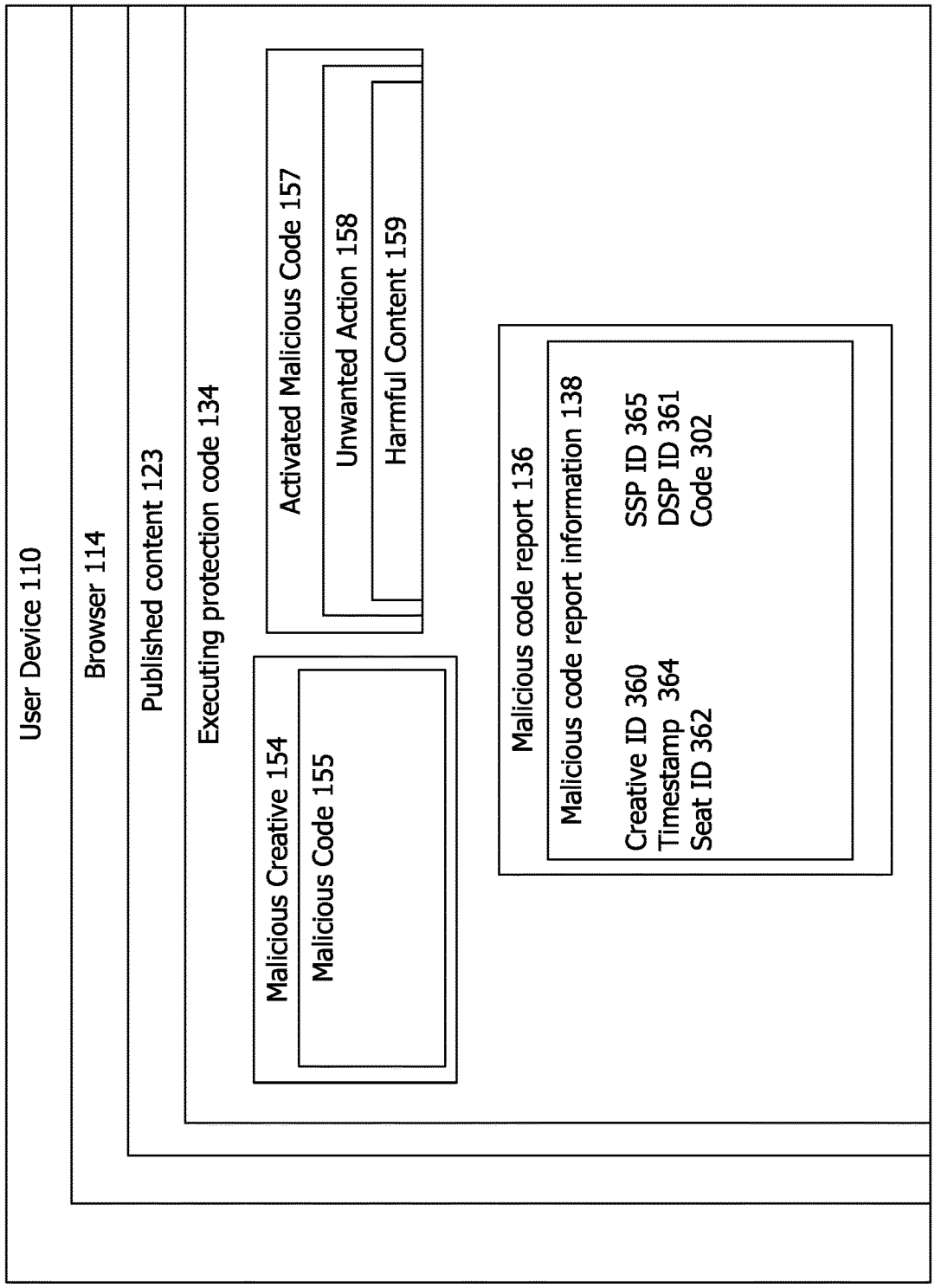
FIG. 1B is a block diagram of a user device executing a protected published webpage content that has the ability to detect and report malicious creatives existing in internet advertisements.
Figure 1C:
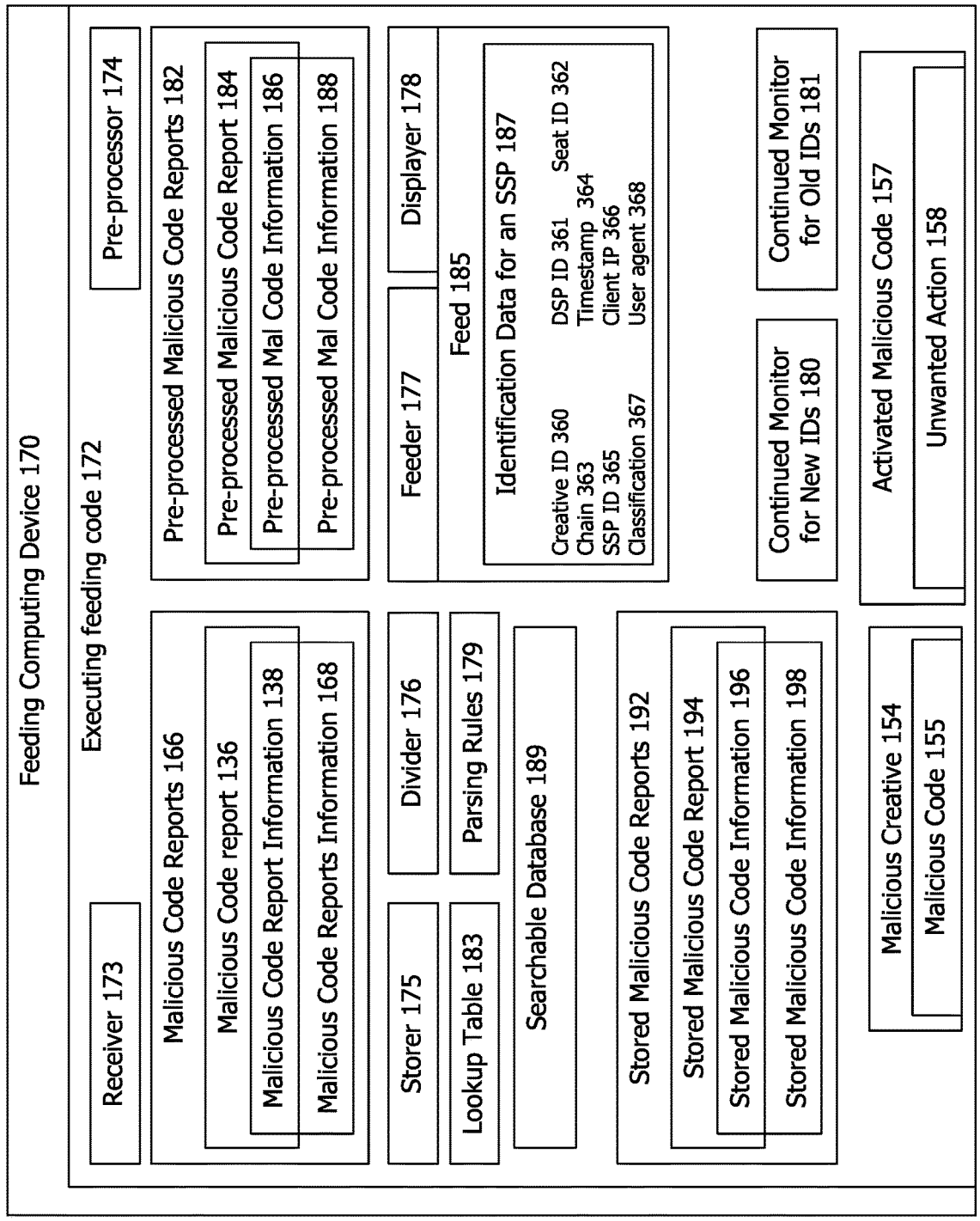
FIG. 1C is a block diagram of a computing device executing a feeding code for extracting and feeding identification data of malicious creatives existing in internet advertisements to supply side platforms (SSPs).

Referring now to FIG. 1C, there is shown the feeding computing device 170 having executing feeding code 172 that has the ability to feed identification data 187 for malicious creatives existing in internet advertisements ("ads") to SSPs. That is, code 172 can extract and feed identification data 187 of malicious creatives 154 detected by code 134 in internet advertisements to SSPs. For example, code 172 is able to receive malicious code report 136 of code 155, extract the malicious code report information 138 and feed the data for the malicious code 155 to SSPs such as an SSP that is intermediary 161. In some cases, code 134 detects the malicious code 155 and sends report 136 reporting the creative 154 that has that code 155 (along with report information 138 for creative 154) to code 172 which then uses feed 185 to feed identification data 187 of the creative 154 (e.g., for malicious code 155) to the SSP that supplied or sent the creative 154.

Information 168 of reports 166 may be information 138 for a number of creatives 154 of a number of reports 136 from one or more of code 134 of device 110 and/or other user devices similar to 110. Identification data 187 may be derived or extracted from information 168, such as noted at FIG. 4. Thus, code 172 can extract and feed identification data 187 to various SSPs for the creatives 154 each of those SSPs provides.

More particularly, the feeding computing device 170 and/or feeding (e.g., extracting and feeding) computer code 172 may feed (e.g., extract and feed) identification data 187 of malicious creative 154 having code 155 existing in internet advertisements ("ads") to intermediary 161 (e.g., an SSP) that sent creative 154 so that the intermediary can block or stop the sending of the creative 154 when it is called in the future (e.g., by call 127). The intermediary may block sending of the creatives by sending an ad in response to call 127 that is not creative 154 or is not a creative identified in the identifying information 187. In essence, the intermediary intercepts or discontinues publishing of the malicious creative or ad identified by code 172. The feeding computer code may be an executing version 172 of code 171. To extract and feed the data, system 100 may only have device 170, code 171 or code 172.

Now describing FIGS. 1A-1C in more detail. The device 110 may be used by user 111 to download, execute or render published content 123 in response to an action by user 111, such as clicking on an area of a webpage, activating a link or entering a URL into a browser. When executed, content 123 may automatically (e.g., without action by user 111) perform call 125 for code 132 and call 127 for an advertisement. The advertisement may be or have legitimate creative 144 and/or malicious creative 154. Content 123 may also automatically perform call 125 for protection code 132 from network 135 or source 130 during rendering of content 123. In some cases, call 125 exists in the header of the page having content 123.

The device 110 may automatically detect and send malicious code reports for creatives 154 of attempted unwanted actions by malicious code 155 existing in internet advertisements ("ads"). Each ad may be or include one or more creatives. Thus, each call 127 may be a call for an ad having one or more of creatives 144 and/or 154. For example, when the user 111 requests the content 123 having a call 127 for creative 154 with code 155, the executing code 134 on device 110 may automatically send malicious a code report 136 of an attempted unwanted action by malicious code 155 to device 170 and/or code 172 without further input or activation by the user.

The user device 110 has display 113; and input/output (I/O) device 117 for data outputting to and data inputting from user 111. The user may be a person using device 110, such as to surf the Internet by using display 113 and device 117 to access browser 114. The device 110 has browser 114 for rendering protected published content 123, executing call 125 for protection code 132 and call 127 for malicious creative 154. Browser 114 may be any of various browsers such as Chrome®, Internet Explorer®, Edge®, Firefox®, Safari® or Opera®. The user device 110 may be any of computing devices 500 (see FIG. 5) such as a personal computer or client computer located at a business, residence for accessing the Internet.

The webpage publisher 120 may be a source of published webpages that are or include protected published content 123 having call 125 for protection code 132 and call 127 for internet creative 144 or 154. The calls 125 and 127 or other calls herein may be HTTP, HTML IP or other calls know for browser 114 and/or network 160. The call 127 may be a call to a supply side platform (SSP) that the publisher is registered with so that publisher can make the call to the SSP and receive the creative 144 and/or 154 from the SSP in response to the call. The publisher may be a business or corporation that sells goods or services.

The protection code source 130 may be a developer of the protection code 132 such as a generator, administrator or author of computer instructions or software that is code 132 which when executed by a computing device is executing protection code 134. The source 130 may receive report 136 and/or information 138 received from device 110 and/or 170 and update code 132 based on reporting information 138. It may also update code 132 based on reports 166 and/or information 168 received from device 170.

The content delivery network (CDN) 135 may be a source of protection code 132 such as provided by protection code source 130. It may receive updated versions of the code 132 from the source 130.

The legitimate advertiser 140 may be an advertiser providing internet advertisements or legitimate creatives 144 for goods and/or services having a legitimate code 145. The legitimate code 145 may be for legitimate redirecting or action by browser 114 to a website of the advertiser 140 or another legitimate advertiser when user 111 clicks on legitimate creative 144 or legitimate code 145. Activation (e.g., execution or rendering) of code 145 may cause an intended action by the browser 114 after or due to user 111 clicking on an area or location of legitimate creative 144 or code 145. In some cases, an intended action is an action that is intended by the user, desired by the user and/or caused by a user action. In some cases, an intended action is an action taken by a browser or sandbox after and/or due to user 111 clicking on an area or location of a creative or its code (e.g., an action caused when code 145 is activated by a browser or sandbox as noted herein). An intended action may be a pop-up, redirect, playing of video, video stuffing, playing of audio, interstitial, etc. cause by activation of code 145 and an intentional user action such as a click using a mouse pointer or keyboard entry.

The malware advertiser 150 may be an illegitimate or malware advertiser that creates malicious creative 154 with or as malicious code 155. In some cases, advertiser 150 adds to or replaces code of internet advertisements for goods and/or services such as legitimate creative 144 with illegitimate or malicious creative 154 or code 155 such as to cause unwanted action by browser 114 to a website other than the intended website (e.g., other than to the advertiser 140 or another legitimate advertiser). The malware advertiser 150 may have a malicious code replacer or adder to put code 155 into legitimate creative 144, thus writing over existing code or adding to code of legitimate code 145 to create malicious creative 154. In other cases, a malware advertiser 150 may simply be an advertiser creates malware as or within the malicious creative 154. Activation (e.g., execution or rendering) of code 155 may cause unwanted action by the browser 114 prior to or without user 111 clicking on any area or location of malicious creative 154 or code 155. In some cases, an unwanted action is an action that is not intended by the user, not desired by the user and/or not caused by a user action. In some cases, an unwanted action is an action taken by a browser or sandbox prior to and/or without user 111 clicking on any area or location of a creative or its code (e.g., an action caused when code 155 is activated by a browser or sandbox as noted herein). An unwanted action may be an automatic or forced pop-up, redirect, playing of video, video stuffing, playing of audio, interstitial, etc. cause by activation of code 155 and without an intentional user action such as without a click using a mouse pointer or without a keyboard entry.

The advertisement intermediary 161 may be an intermediary between webpage publisher 120 and advertisers 140 and/or 150 for providing (e.g., serving or sending) advertisements such as creatives 144 and/or 154 to the publishers content 123. The advertisement intermediary 161 may be a supply side platforms (SSP) or a demand side platform (DSP) that signs up advertisers 140 and/or 150 and provides the creatives 144 or 154 in response to the call 127 for advertisements by the content 123. Intermediary 161 may be a third party advertiser; a provider of third party Java Script code that is distributed to the webpage owners or publishers webpages.

The advertisement intermediary 161 may unknowingly provide malicious creative 154 to the publisher's content 123 in response to call 127. The intermediary 161 may represent multiple intermediaries between the advertisers 140 and/or 150 and publisher 120. The webpage publisher 120 may registers its supply of add spaces/placements where it can show ads with an SSP who is a broker and/or distributor to publishers for ads that the SSP receives from DSPs, advertiser 140 and/or advertiser 150. When a creative is executed by content 123, a count or impression may be returned to the intermediary or advertiser. When the advertiser is informed of the count, they pay the publisher for displaying the creative. The intermediary 161 may be the supply side platform (SSP) that provides the creative 154 in reply or response to the call 127 for an ad from publisher 120.

The feeding computing device 170 has the feeding code 171 for feeding identification data 187 of malicious creatives 1547 existing in internet advertisements to intermediaries such as supply side platforms (SSPs). Feeding the identification data may include extracting certain parts of the identification data 187 and feeding the data 187 to an intermediary 161. When feeding code 171 is executed by a computing device it is executing feeding code 172 that feeds (extracts and feeds) identification data to SSPs for malicious creatives existing in internet advertisements ("ads"). The feeding computing device 170 may have and/or be a developer of the feeding code 171 such as a generator, administrator or author of computer instructions or software that is code 171. In some cases, the feeding computing device 170 may be a user of the feeding code 171 such as an administrator of or device executing the computer instructions or software that are executing feeding code 172. In certain cases, the source 130 and the device 170 may be the same entity or business that provides code 132; and provides or executes code 171. The feeding device 170 may be any of computing devices 500 (see FIG. 5) such as a personal computer or server computer located at a business for processing reports 136 received by accessing the Internet.

The device 170 may receive report 136 and/or information 138 from device 110 and feed (e.g., extract and feed) identification data of creative 154 to the SSP providing that creative, based on the report and/or information. For example, device 170 includes feed 185 for feeding the identification data 187 to the SSPs.

Information 138 may include creative identification number 360 for creative 154 of detected code 155, which is generated by the sending SSP for each creative and uniquely identifies each creative 154 to the sending SSP; an SSP identification number 365 for the intermediary 161 that provided creative 154, which is generated by the publisher 120. browser 114, code 134 or SSPs that uniquely identifies each SSP sending ads to publisher 120; and a timestamp 364 for the time (e.g., current date, hour, minute and second) when creative 154 or code 155 was detected by code 134. It may include a seat identification number 362 which is an account number generated by the providing SSP identifying who the SSP is paid by for showing the creative 154. Each individual creative 154 showing on a page 123 may be an instance of a creative which comes to the SSP from a certain account of a DSP upstream of the SSP to browser relationship, and the Seat ID may identify this account. It may also include a copy (e.g., ASC or text) of code 302.

Each of the numbers of information 138 is a characteristic of the creative 154, which an ad is an instance of. The SSP ID number 365, seat ID 362 and timestamp 364 may be added by code 134 to identify an SSP name of intermediary 161 that provided creative 154, who the SSP is paid by for the ad and time of detection of code 155.

Timestamp 364 may be a time when code 172 received report 136. Information 138 may also include a DSP identification number 361 for the DSP that supplied creative 154, which is generated by the SSP for its DSPs, or is generated by DSPs of an SSP and uniquely identifies each DSP providing the creative to the sending SSP. In some cases, timestamp is part of or extracted from a chain (e.g., an action log) of events 363 detected by code 134 that led to unwanted action 158. In this case, chain 363 may be part of the report instead of timestamp 364.

Feeder includes feed 185 for feeding identification data 187 that identifies creatives 154 to the SSPs (e.g., of intermediaries 161) that provide them, such as identified by SSP number in information 168 or extracted from information 168. Feed 185 may be a webpage or other data source that intermediary 161 has access to, such as by having a subscription to or being a client of the developer of code 132 and/or code 171.

Identification data 187 may include creative identification number 360, an SSP identification number 365 and a timestamp 364. It may also include a DSP identification number 361, an unwanted action classification 367, a client IP address 366. It may include seat ID 362, chain 363 and/or user agent string 368.

Figure 3:
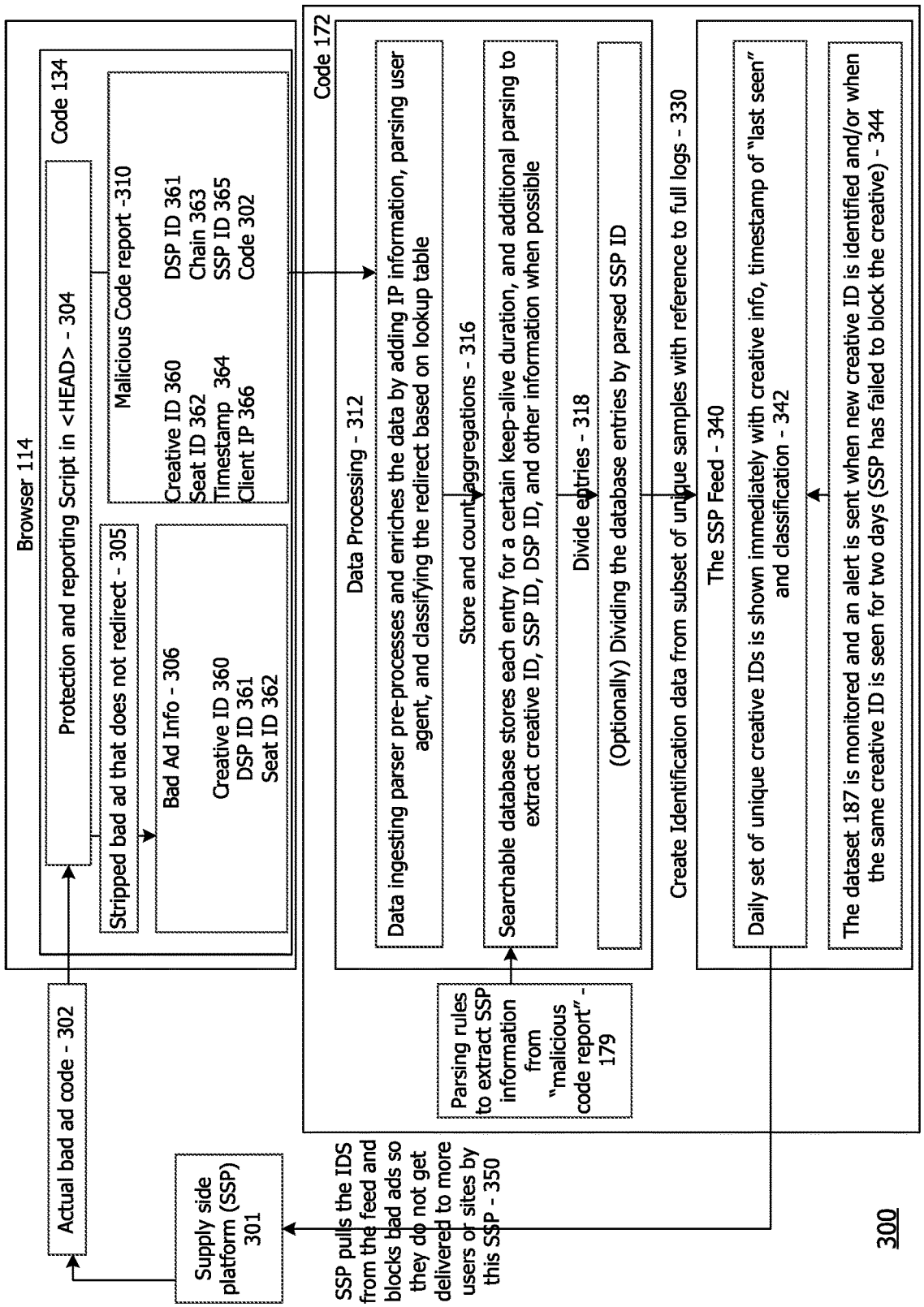
FIG. 3 is a flow diagram of an operating environment/process for extracting and feeding identification data of malicious creatives existing in internet advertisements to supply side platforms (SSPs).
Figure 4:
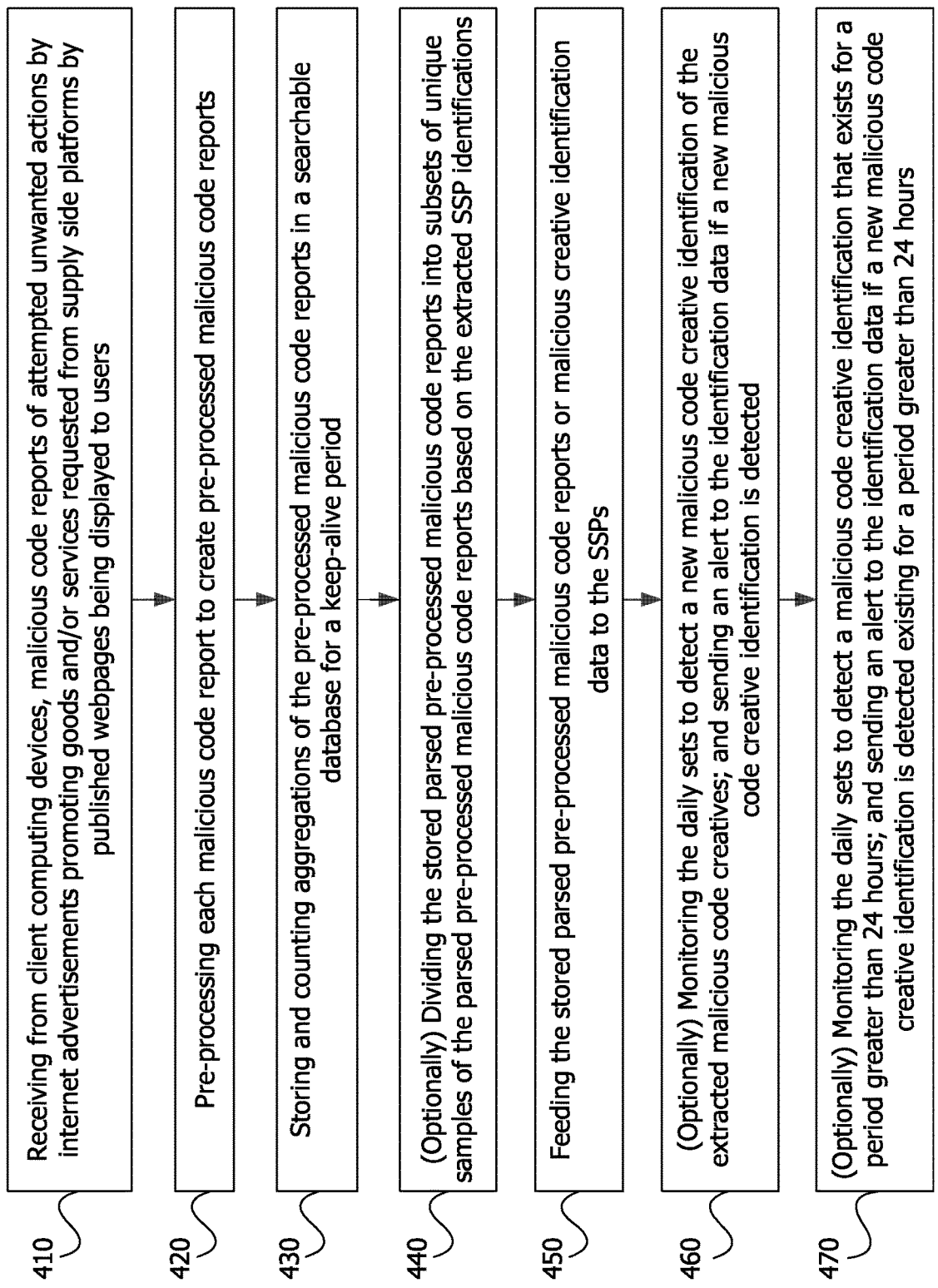
FIG. 4 is a flow diagram of a process for extracting and feeding identification data of malicious creatives existing in internet advertisements to supply side platforms (SSPs).

Code 172 may extract or derive client IP address 366, unwanted action classification 367, and user agent string 368 from information 168, such as noted at FIGS. 3-4.

Unwanted action classification 367 may be classification or type of action for action 158 of creative 154. Client IP address 366 may be the IP address of device 110 or browser 114 that executed the ad 302 or creative 154; or from which the report 136 is being sent to code 172. Client IP address 366 may uniquely identify the device or browser to code 172. Agent string 368 may be the type of browser that browser 114 is (e.g., Internet Explorer, Safari, Firefox, Google Chrome, etc.).

The device 170 may receive report 136 and/or information 138 from device 110 and update code 171 based on that information. It may also update code 171 based on reports 166 and/or information 168 received from other user devices similar to device 110.

The content 123, the creative 144, the code 145, the creative 154, the code 155, code 132 and/or the code 171 may be computer instructions in one or more software language such as but not restricted to JavaScript (JS), hyper-text markup language (HTML), Cascading style sheets (CSS), and the like. A creative may consist of the initial payload, which will then call, include, or otherwise reference additional source files downloaded from external sources (such as additional JS, HTML, CSS, image or other files as defined above), each of which may further reference additional files. The additional files may be used to track visits, serve additional user interface elements, enable animation or cause legitimate or illegitimate redirects to other sites or locations, or other activity.

The network 160 may be a network that can be used to communicate as noted for the network attached to computing device 500 of FIG. 5, such as the internet. Each of the components of system 110 may have a network interface for communication through a data connection with the network 160 and with other components of the system 100. Each data connection may be or include network: connections, communication channels, routers, switches, nodes, hardware, software, wired connections, wireless connections and/or the like. Each data connection may be capable of being used to communicate information and data as described herein.

FIG. 1B, shows the user device 110 having browser 114 executing a protected published webpage content 123 that has the ability to detect malicious code 155 existing in internet advertisements. The FIG. 1B may show user device 110 at a point in time after the webpage 123 is rendered; and protection code 132 has been downloaded and is executing as executing protection code 134. At this time call 127 has been executed; and malicious creative 154 having malicious code 155 has been downloaded or received.

FIG. 1B also shows code 134 having or executing malicious creative 154 with malicious code 155 in browser 114. The code 134 may detect, intercept and/or report malicious code 155, such as deferred and/or click types of unwanted actions attempted or requested by the malicious code 155. The code 134 may take many forms but is defined by its capability to send malicious code reports 136 having malicious code information 138 to device 170, where the reports report attempted unwanted actions performed or caused by the malicious code 155. In addition to sending the malicious code reports, the code 134 may block the attempted unwanted action. In some cases, the code 134 may operate in a protected portion of memory that is denied access to any other portions of memory.

The code 134 also has activated malicious code 157 which is malicious code 155 activated by browser 114 and/or code 134. The activated code 157 may cause a browser unwanted action 158 which can cause harmful content 159, such as the download of harmful content. In some cases, activated malicious code 157 and/or unwanted action 158 may be considered an "attempted" unwanted action 158 by malicious code 155 because they are detected and/or intercepted by code 134. Detecting code 155 may be cod 134 detecting the attempted unwanted action 158 when it is automatically attempted. Intercepting may code 134 be stopping execution of, preventing execution of, preventing activation of, discontinuing rendering of, blocking calls from, stopping calls of, stopping any downloads caused by code 157, and/or refusing to load the malicious code 159 into browser 114.

Finally, the code 134 has malicious code report 136 that will be sent to device 170 (e.g., to code 172) and that has malicious code report information 138 that reports the attempted unwanted actions of the code 155 and/or the actual code 155 detected by code 134. In some cases, the information 138 includes the code 155, the unwanted actions requested by code 155. The information 138 may also include other information such as the types of unwanted action requested by the malicious code 155.

A report 136 may be created for each and information 138 may include information for each malicious creative 154 of each code 155 that code 134 is detecting and/or intercepting.

In general, the code 134 is designed and operates in such a way that it automatically reports in report 136 actions that are more likely to be used for nefarious purposes or that can otherwise operate negatively or beyond the scope of what is typically necessary for an advertisement. In some cases, code 134 is Java script code that focuses on malicious ads such as creative 154 and reports in reports 136 unwanted actions (such as redirects, pop-ups, video stuffing, etc.) by malicious code 155 (e.g., calls, scripts, payload and the like) and information 138 can include the code 155 when that code is JavaScript/ES (JavaScript/ECMAScript, a standard governing Javascript—a scripting-language specification standardized by Ecma International in ECMA-262 and ISO/IEC 16262), HTML, cascading style sheets (CSS) (whether executed as a part of an ad or otherwise delivered to the webpage in some way).

FIG. 1C shows code 172 at a point in time after malicious code report 136 having malicious code report information 138 has been received at device 170. Device 170 and code 172 are shown having numerous malicious code reports 166 that include or have malicious code report information 168 of the numerous reports 166. Each of reports 166 is for one of numerous ones of malicious code 155, where each of the code 155 may be the exact same code or a different malicious code. When two of the malicious code 155 in information 168 are for the same code, that same code may be for a same two creatives 154 or for different ones of creatives 154. Report 136 may be one of many such malicious code reports of reports 166 received by device 170 and code 172 from device 110 that report malicious 155 and attempted unwanted actions of code 155. In addition, malicious code reports 166 may include malicious code reports received by device 170 and code 172 from various other user devices similar to device 110 that are sending reports 166 for various additional malicious codes 155 and corresponding attempted malicious unwanted action of each of those codes 155. Thus, report 136 is shown as one of malicious code reports 166; and reports 166 include or have malicious code report information 168, which includes malicious code report information 138.

FIG. 1C also shows the code 172 including receiver 173, pre-processor 174, storer 175, divider 176, feeder 177, displayer 178, parsing rules 179 and lookup table 183. FIG. 1C also shows the code 172 including continued monitor for new identifications 180 and continued monitor for old identifications 181.

Receiver 173 is a component, such as hardware and/or software, that receives malicious code reports 166 having malicious code information 168. The receiver 173 receives from client computing devices (e.g., such as from code 134 of various devices 110) malicious code reports 166 for attempted unwanted acts by malicious codes 155 of internet advertisements (ads) or creatives 154 requested by content 123 of webpage publishers 120 from third party ad sources and/or supply side platforms (SSP).

Pre-processor 174 is a component that pre-processes reports 166 having information 168 to create (e.g., extract) pre-processed malicious code reports 182 having pre-processed malicious code information 188, such as noted at FIGS. 3-4. The pre-processed malicious code report 184 is shown as one of pre-processed malicious code reports 182; and the pre-processed malicious code information 188 is shown as one of pre-processed malicious code information 186.

Storer 175 is a component that further processes pre-processed reports 182 having pre-processed information 186 to create (e.g., extract) and store the further processed reports and information as stored malicious code reports 192 having stored malicious code information 198, such as noted at FIGS. 3-4. The stored malicious code report 194 is shown as one of stored malicious code reports 192; and the stored malicious code information 198 is shown as one of stored malicious code information 196.

The divider 176 is an optional component for dividing the stored parsed pre-processed malicious code reports 192 into subsets of unique samples of the parsed pre-processed malicious code reports based on the extracted SSP identifications or SSP identifications in information 168, such as noted at FIGS. 3-4. In some cases, divider 176 divides reports 192 into subsets of unique samples based on the extracted DSP identifications or DSP identifications in information 168.

The feeder 177 is for feeding the stored parsed pre-processed malicious code reports 192 (e.g., "bad creative metadata") and/or data 187 to the SSP, such as noted at FIGS. 3-4. When divider 176 is present, feeder 177 is for feeding and/or publishing the stored parsed pre-processed malicious code reports 192 to various SSPs based on the extracted SSP identifications or SSP identifications in information 168. In some cases, feeder 177 feeds reports 192 and/or data 187 to the DSPs based on the extracted DSP identifications or DSP identifications in information 168

Feeder 177 includes feed 185 providing (e.g., providing access to) identification data 187 to the SSP for the malicious creatives 154 provided by that SSP. Identification data 187 for an SSP is or may include the stored malicious code reports 192 and/or stored malicious code information 196 for the providing SSP, such as based on the extracted SSP identifications or SSP identifications in information 168. Feed 185 can provide data 187 to DSPs of creatives 154 similar to how it does for SSPs of creatives 154.

The displayer 178 is an optional component for displaying feed 185 and/or identification data 187 for each of the single SSPs, the identification data 187 showing the daily set of unique malicious creatives 154 provided by each providing SSP. Displayer 178 can display the feed 185 and/or identification data 187 to DSPs of creatives 154 similar to how it does for SSPs of creatives 154.

The parsing rules 179 may be used by pre-processor 174, storer 175 and/or feeder 177 to perform their processes (e.g., extracting and feeding), such as noted at FIGS. 3-4.

The lookup table 183 may be used by pre-processor 174, storer 175 and/or feeder 177 to perform their processes, such as noted at FIGS. 3-4.

The continued monitor for new identifications 180 is for monitoring the daily sets to detect a new malicious code creative identification of the extracted malicious code creatives; and adding (e.g., sending) an alert to the identification data if a new malicious code creative identification is detected, such as noted at FIGS. 3-4. In some cases, the time period for continued monitoring to send an alert can be an hour, ten minutes, a minute or in real time. In one case, an alert is sent in real time, whenever code 172 is able to feed identification information 187, such as noted at FIGS. 3-4.

The continued monitor for old identifications 181 is for monitoring the daily sets to detect a malicious code creative identification that exists for a period greater than 24 hours; and adding (e.g., sending) an alert to the identification data if a malicious code creative identification is detected to exists for a period greater than 24 hours, such as noted at FIGS. 3-4.

Each of browser 114, published content 123, call 125, call 127, protection code 132, executing code 134, feeding code 171, executing code 172 and/or components 154-198 may each be computer data and/or at least one computer file.

Description of Processes

Figure 2:
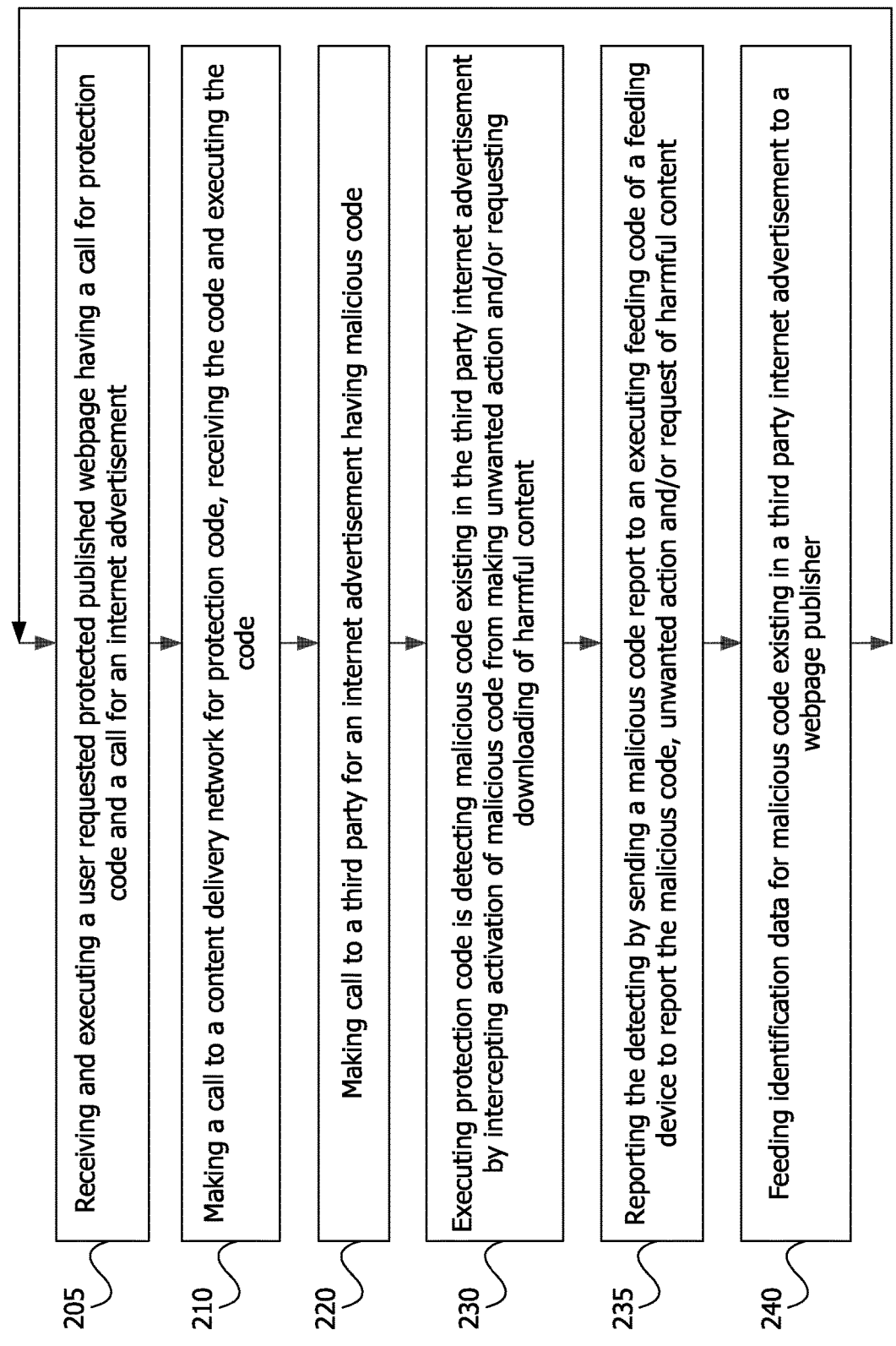
FIG. 2 is a flow diagram of an operating environment/process for managing the detecting, reporting, extracting and feeding of identification data of malicious creatives existing in internet advertisements to supply side platforms (SSPs).

Using the system 100 is possible to manage extracting and feeding identification data 187 of malicious code 155 existing in internet advertisements to supply side platforms (SSPs). The management may include communicating between components of the system 100. For example, referring now to FIG. 2 is a process 200 for managing the detecting, reporting, extracting and feeding identification data of malicious code 155 existing in internet advertisements to supply side platforms (SSPs). The process 200 may be or describe an operating environment in which the system 100 can perform the managing. The process 200 may be performed by the system 100, such as shown in FIGS. 1A-C. The process 200 starts at 205 and can end at 240, but the process can also be cyclical and return to 205 after 240. For example, the process may return to 205 when a publisher's webpage is requested by a user of any of various user devices 110 connected to network 160.

The process 200 starts at 205 where a user requested protected publisher webpage is received and executed, such as by the device 110 or the browser 114. The webpage may be or include content 123 having the call 125 to CDN 138 (or source 130) for protection code 132. Content 123 also has call 127 for an internet advertisement or creative 144 or 154. It may be a call for the malicious creative 154 or an ad for goods and/or services having malicious creative 154. Call 127 may be to a third party advertisement source such as to malware advertiser 150, intermediary 161 and/or an SSP. Call 125 may exist in a header of the webpage or content 123 and thus be executed before execution of other content of the webpage such as before call 127 that is not in the header.

Next, at 210 the call 125 for protection code 132 is executed or sent; and the protection code 132 is received or downloaded. Calling and receiving at 210 may include device 110 or browser 114 making the call 125 to content delivery network (CDN) 138 (a source of code 132) or another source of code 132. In some cases, call 125 is to source 130 for protection code 132. Calling and receiving at 210 may include calling for protection code 132, receiving code 132 and executing code 132 as executed code 134.

Then, at 220 the call 127 is made or sent to a third party internet advertiser or intermediary 161 for an internet advertisement having malicious creative 154 having malicious code 155 existing in it. Making the call at 220 may include executing the call 127 for; and receiving or downloading the internet malicious creative 154 from advertiser 150, intermediary 161 and/or an SSP. At this point source of creative 154, user 111, device 110 and browser 114 may not know that the malicious creative 154 has malicious code 155.

Now, at 230 the malicious code 155 existing in a third party internet malicious creative 154 is detected by the executing protection code 134 executed at 210. Detecting at 230 may include code 134 monitoring execution or rendering of code 155. Detecting at 230 may include code 134 detecting and intercepting execution or activation of an attempted unwanted action 158 performed by code 155.

The detecting at 230 may protect content 123 from executing or displaying to the user 111, an unwanted action caused in response to the activation of the malicious code 155. In some cases, detecting at 230 includes intercepting activating malicious code 157 from making unwanted action 158, such as a request or redirect for downloading of harmful content 159.

Next, at 235 the detecting is reported by sending a malicious code report 136 to an executing feeding code 172 of a feeding device 170 to report the malicious creative 154 having code 155. Reporting at 235 may include sending to feeding computing device 170 or code 172, report 136 having reporting information 138 that is based on the detecting at 230. Reporting information 138 may report or include malicious creative 154, code 155 and/or unwanted action 158. Reporting information 138 may include other information as noted for FIGS. 1C and 3-4.

Now at 240, identification data 187 for malicious creative 154 (e.g., of detected code 155) existing in the third party internet advertisements is fed to the SSP that provided the creative 154. Feeding at 240 may be or include feeder 177 feeding or feed 185 providing identification data 187, stored malicious code reports 192 and/or stored malicious code information 196 to providing SSPs of creatives 154.

Feeding may be performed by executing feeding code 172 of feeding device 170 based on malicious code report 136 detected at 230. Feeding may also be based on various other malicious code reports of reports 166 detected at device 110 and/or other user devices similar to 110. Feeding at 240 will be discussed further below with respect to FIGS. 3-4.

Feeding at 240 may optionally include updating the protection code 132 and/or code 171 at source 130 and/or device 170 based on the reports 166, such as where those reports are also sent to source 130 and/or device 170. The updated protection code 132 can be sent to network 135 for downloading by the device 110 or numerous other user devices like device 110.

Using the device 170 or code 172 it is possible to feed identification data 187 to SSPs for malicious creatives 154, such as noted at 240. The feeding may include communicating between the system 100 components. For example, referring now to FIG. 3 is a process 300 for feeding (e.g., extracting and feeding) identification data 187 to SSPs for malicious creatives 154 existing in internet advertisements. The process 300 may be or describe an operating environment in which the system 100 and/or code 172 can perform the feeding of identification data 187 to SSP 301 which may be an SSP of intermediary 161. The process 300 may be an example of executing at 240, and optionally receiving the reporting at 235, performed by the device 170 or the executing feeding code 172 of FIG. 1C.

The environment/process 300 starts at 301 and can end at 350; but the process can also be cyclical and return to 301 or 308 after 342 or 344. For example, after 342 or 344 the process may return to 302 for each internet malicious creative 154 that is requested by a call from a protected publisher's webpage content 123 of any of various ones of the user device 110 without or prior to the SSP 301 actually blocking creatives at 350. In another example, after 342 or 344 the process may return to 308 for each internet malicious creative 154 that is requested by a call from a protected publisher's webpage content 123 for the current stripped bad ad at 305, without the browser calling or receiving another ad at 302-305. In some cases, determining "if" a condition, occurrence or event happened in process 300 may be determining "when" that a condition, occurrence or event happened.

At 302, actual bad ad code (e.g., creative 154 with code 155) is sent by SSP 301 (e.g., intermediary 161) to and received by browser 114. The creative 154 or code 155 can be sent by a DSP, and may be sent un-known to the SSP. Receipt by the browser may be detected by and the execution of the creative 154 may be monitored by protection and reporting script 304 of browser 114. Script 304 can be code 134 executing invisibly and unknown to the user. Script 304 may execute anywhere in content 123 of browser 114 of device 110, in response to call 125 of content 123. In some cases, script 304 executes in the header ("<HEAD>") of page 123 in browser 114 of device 110, in response to call 125 of content 123. Script 304 may be delivered and executed alongside the creative 154 to monitor its behavior, or otherwise be injected into the page 123 (e.g. in in-app environments); potentially, saying "script previously initialized on the page" would be helpful. In this case, script 304 (e.g., code 132) may be delivered as part of creative 154 or the ad sent by the intermediary 161 in response to call 127. Sending at 302 can be sending creative 154 with code 155 by intermediary 161 in response to call 127 for an ad. Sending at 302 may include descriptions for receiving at 205 and making a call at 210 and 220.

At 305, stripped actual bad ad code from 302 is executed by browser 114 and/or by code 134, but does perform an unwanted action 158, such as it does not redirect. The unwanted action 158 may be other things except redirecting, such as video stuffing, causing obtrusive auto-play ads, etc. The bad ad code from 302 that does not actually perform an unwanted action 158 or redirect may be detected and prohibited from an unwanted action 158 by code 134 performing process other than stripping. Not redirecting at 305 may include descriptions for code 134 detecting and/or intercepting malicious code 155 or unwanted action 158 caused by activated code 157 of creative 154. Not redirecting at 305 may include descriptions for detecting at 230. For instance, at 305, the stripped actual bad ad code may be a detected and intercepted version of creative 154 or code 155 that cannot successfully perform the unwanted action 158 and thus that action can only be attempted. In some cases, code 134 causes browser 114 to execute a stripped version of bad ad 302 that does not redirect into another page but that will ultimately display creative 154 and that does not execute the unwanted action 158.

At 306, the script 304 or code 134 obtains or flags the detected bad ad information 306 delivered by the SSP 301 for the ad that does not redirect at 305. Bad ad information 306. For example, code 304 may perform some of the extracting described herein and information 306 may be information 187 with some or all of the data (e.g., IDs 360-362, timestamp 364 and ID 365) extracted and/or parsed out. Then, code 172 may perform the remainder of the extracting and parsing described herein.

In one example, for 302-308, an advertiser registers the advertiser's demand that they want to show ads with a DSP; and then DSP contacts an SSP 301 which supplies ads to publisher 120. The publisher 120 previously registers its supply of advertising spaces or placements where it can show ads in content 123 with SSP 301. Publisher 120 may be a website that shows ads to users 111 to monetize its existence. The publisher 120 may uses one or more SSPs 301 to provide advertising because the publisher provides a supply of ads to an advertising ecosystem including users 111. The user 111 is ready to view the ads and publisher 120 is the supplier of ad 308 to the user, which comes from the SSP 301. A demand side platform (DSP) registers its ads with the intermediary 161 or SSP 301 to show them on the publisher's web page placements; and the intermediary 161 or SSP 301 chooses which ad to put in which placement. The SSP selects to show a certain ad in a certain placement of the webpage which is registered or sent to the SSP by the publisher so that SSP can fill the placement.

At 310, the protection and reporting script 304 executing in browser 114 of device 110 reports a malicious code report 136 for creative 154 or code 302 to executing feeding code 172 of device 170. Reporting at 310 may include descriptions for reporting at 235. For instance, at 308, the code 304 may report the ad information 306 of the actual bad ad code 302 detected at 305, or creative 154. As noted above, here, information 306 may be partially extracted or may not be partially extracted (e.g., is just an action log or stream of text), The malicious code report 136 includes malicious code report information 138 having information 306. It may also have a chain of events 363 detected by code 304 that led to unwanted action 158 (e.g., a redirect attempt, such as without user action) by code 155 of creative 154. It may also include a timestamp 364 of when code 155 or action 158 was detected by code 304. It may also include an SSP identification number 365 for the SSP 301 that sent the code 302 or creative 154. In some cases, number 365 is a name of the SSP.

For example, report 136 may indicate to code 172 that code 134 or browser 114 was on a website of content 123 and a certain SSP 301 (by SSP ID number 365) sent this creative (by creative ID number 360) that attempted a redirect/unwanted action 158; and that code 134 detected action 158, stopped execution of code 302, blocked action 158 and is reporting information 138 for creative 154. Report 136 and/or information 138 may be ASC, text or raw data in a format that depends on SSP 301 who sent code 302.

At 312, the feed code 172 executing on device 170 data processes malicious code report 136 for creative 154 or code 302 to create pre-processed malicious code report 184. Similar data processing may create pre-processed reports 182, information 186 and information 188 from reports 166, information 138 and information 168, respectively.

Data processing at 312 may include a receiver 173 of code 172 receiving malicious code report 136 for creative 154 or code 302 from the protection and reporting script 304.

Data processing at 312 may include a pre-processor 174 (e.g., a data ingesting parser) of feeding code 172 pre-processing and enriching the information 138 to create the information 186 by: determining and adding IP address information 366 based on communication with browser 114 and/or code 134, such as by parsing the IP address of (e.g., associated with) the message sender that sends report 133; and determining and adding user agent string 368 that identifies the type of browser based on communication with browser 114 and/or code 134, such as by parsing the browser type that sent report 133 or indicated in the message that sends report 133. This parsing may be detecting and extracting the IP address 366 and agent ID 136 by identifying each of those data's format, type and/or field location in a message, message header or metadata.

Pre-processing and enriching may also include determining and adding the classification 367, such as by classifying the (e.g., attempted) unwanted action 158 based on lookup table 183. This may classify the redirect or unwanted action 158 based on a look up table 183 to determine what kind or type of unwanted action it is such as if the action is a redirect, pop-up, click, etc. For example, the chain of events 363 may be compared with a list of various chains of events in a lookup table and the most similar chain of the table may be selected to determining the classification. In some cases, the code 134 (e.g., client-side script) will report a "reason" for blocking in report 310 (such as in chain 363), which may be a numeric or string ID of a known attack, a type of unwanted behavior 158 that was blocked, or another message that can be used to later identify the reason for blocking. Based on the report 310, the classification 367 at 312 by code 172 (e.g., on the backend side) will then be twofold: (a) classifying the threat based on the reported reason (where the chain/action log may be used indirectly to adjust the classifier and build more "reasons", but the "reason" is used to actually classify the threat), and (b) classifying the participants in the chain/action log to determine the SSP, DSP, ad server (e.g., advertiser 150) and other participants who may have delivered the creative to the page. This (b) identification may be done using the action log list and parsing rules and lookup tables.

In some cases, client IP 366 and agent string 368 are not collected at 306 or reported in report 310. In other cases, client IP 366 that is collected at 306 is only parsed out as anonymized data based on the IP address (such as ISP, country, city, zip code, etc.) to collect general non-identifying info about where the action took place. In some cases, the actual IP will no longer be collected at 306 and will be discarded.

Classification 367 of action 158 may be a process for receiving and rendering ads such as a click( ) that is forced without the user action (e.g., an unwanted action 158 that is a click), document.write, element.innerHTML, (iframe-|script).src; or appendChild or replaceChild or insertBefore or other such method. Other classifications for receiving and rendering ads are considered; and there may be fewer or more than the 4 example processes mentioned here. Each of these processes may be a method that browser 114 is exposed to Javascript which may be what malicious creative 154 and code 155 are written in and what protection code 134 is written in. It can be appreciated that other than Javascript, various other languages or types of code may be used.

At 316, the feed code 172 executing on device 170 stores and counts aggregations of the pre-processed malicious code report 184 to create stored malicious code report 194. Similar storing and counting may create stored reports 192, information 196 and information 198 from pre-processed reports 182, information 186 and information 188, respectively.

Storing and counting at 316 may include a storer 175 of feeding code 172 storing (e.g., in a searchable database 189) and counting information 188 to create stored information 198 by: storing each entry of information 198 for a certain keep-alive duration. Storing may include performing additional parsing of information 198 to extract and store various parts of the data to be fed in database fields, such as the creative ID 360, DSP ID 361, and other information when possible from each information 186. As noted, creative ID 360 may have been parsed by code 134, identified in report 310 and is not parsed by code 172. The keep-alive duration may be a selectable or configured time. It may be an hour, a day, a week or longer than a week. In some cases, it is two weeks. The other information may be seat ID 362, chain 363, timestamp 364 and/or SSP ID 365 that are parsed from each information 186. In some cases, the parsing rules 179 extract and store this information in fields of the database 189 from each of malicious code reports 182.

For example, code 172 may parse (e.g., detect and extract) the data of each pre-processed malicious code report 184 based on parsing rules 179 to extract the malicious code creative identification 360, a SSP identification 365 for the malicious code, and the demand side platform (DSP) identification 361 of the malicious code report. In some case, code 172 parses the ad server identification. It may also parse each report 184 to extract METADATA of the malicious creative 154, and other information of the malicious creative 154. This information is stored in database 189 as information 198 of reports 192.

The parsing rules 179 may be rules for detecting and extracting the ID 360, ID 365, ID 361, etc. by identifying each of those data's format, type and/or field location in a message, message header or metadata. The parsing rules 179 may be able to detect and extract the identifications when different ones of the information 186 is in different formats depending on the providing SSP of each of creatives 154; and when information 138 and/or 186 is raw data or only blobs of text received from code 134.

In some cases, the code 134 (client-side script) may send the report 310 with creative ID/details 360 and also may sent action log (chain 363) which provides a detailed log of actions that happened within the creative 154 prior to the blocked action 158. Then, at 312 and/or 316, the feed processing code 172 on the back-end, per each malicious code report 310 that contains an action log will utilize a set of parsing rules 179 to attempt and classify which SSP, DSP, and ad server this malicious creative 154 belongs to or originated from.

To classify, each log record within the action log is processed against an array of regular expressions of rules 179 or a LUT to see if there is a match. If a match is found, subsequent IDs (such as creative IDs, seat IDs, etc.) are extracted using the regular expression or using a follow-up regular expression in the rules. Thus, the array of regular expressions may be the "parsing rules" 179.

The order in which the action log entries of chain 363 are processed at 312 and/or 316 may vary and the degree of confidence of classification may be measured in various ways. Also, classification may be further optimized at 312 and/or 316.

The code 134 may also contain the creative ID and seat ID if the code 134 was not in the head of the page, but instead got delivered alongside the creative at 302. In this case, the demand source delivering the creative may pass the necessary IDs to the code 134, and then the code 134 will pass those IDs to the back-end code 172. In this case, code 172 can compare both the provided creative IDs from code 134 and the parsed IDs performed by code 172 to ensure consistency and further optimize parsing rules 179 by updating the rules to cover situations where the two IDs are not the same.

After this parsing, code 172 may store the parsed preprocessed malicious code reports as stored reports 192 in the searchable database 189 (e.g., a "bad creative metadata" database). Each of reports 192 may have information 198 including the extracted creative identification 360, the SSP identification 365, the DSP identification 361, the timestamp 364 of the unwanted action attempt 158 and the classification 367 of the type of the unwanted action attempt 158 from each report of reports 182. Each of reports 192 may optionally have METADATA of the malicious code, and other information.

In some cases, when storing at 316, code 172 creates a searchable database 189 having an entry for each report 194 of reports 192 with the information 196 including creative ID 360, DSP ID 361, and Seat ID 362; IP address 366, agent string 368 (e.g., type of browser 114), and classification 367 of the unwanted action. In some cases, address 366 is not be included. Instead, some data derived from IP address 366, such as ISP and country for address 366 will be included. Searchable database 189 can be searched and data processed based on one or more of the creative ID 360, DSP ID 361, Seat ID 362, chain 363, timestamp 364, SSP ID 365, IP address 366, classification 367 and/or agent string/type of browser 368. It is considered that other data is also available to be parsed from report 310.

In some cases, the information 196 of each entry is in different formats depending on the SSP that provided the creative 154 for that information 196. However, rules 179 allow code 172 to parse or separate out each information 196 of information 198 for each providing SSP based on SSP ID 365 of each of information 196.

For example, at 318, a divider 176 of feed code 172 executing on device 170 divides the stored malicious code reports 192 by SSP ID 365 to create identification data 187. This dividing may include divider 176 using rules 179 to divide the stored parsed pre-processed malicious code reports 192 into subsets of unique samples based on the extracted SSP identifications, where each subset of unique samples has the parsed pre-processed malicious code reports for a single SSP of the extracted SSP identifications. After being divided by SSP, each subset of reports 192 or information 198 for each SSP may be data 187 for that SSP.

After dividing at 318, a counter of storer 316 can count the number of instances of each creative ID 360 in stored information 198 for each SSP so that redundant ones of information 196 of information 198 are aggregated. The count may be shown as part of data 187 for a single entry of the ID 360, instead of showing a list with each entry.

After dividing at 318 and optionally counting at 330, subsets of unique samples with reference to full logs have been created for each SSP as identification data for an SSP 187. Data 187 may be identification data of malicious creatives 154 existing in internet advertisements supplied to that SSP 301. If counting is performed at 330, the subsets are divided out by SSP and have the repetitive creative ID entries aggregated into a single entry that shows a count.

The full logs of the information 198 for each SSP or data 187 are available, such as including creative ID 360, the count of IDs 360 for this entry, DSP ID 361, seat ID 362, chain 363, timestamp 364, SSP ID 365, client IP 366, classification 367 and/or user agent string 368. In some cases, only the ID 360, count, DSP ID 361, seat ID 362 and timestamp are included. In some cases, only the ID 360, DSP ID 361 and timestamp are included. In some cases, the SSP ID is not needed since this data 187 is separated by and only accessible to a certain SSP having authorization for data 187.

At 340, a feeder 177 of feed code 172 executing on device 170 feeds the stored malicious code information 198 and/or identification data 187 to the SSPs that sent the code 302 or creatives 154. Feeding at 340 may include making the SSP feed 185 of data 187 available to the SSP 301 using feeder 177 and/or displayer 178 of code 172. Feeder 177 may provide feed 185 separately to each SSP by text, by email, by fax, posted on website needing account authorization (e.g., username and password) or the like. In some cases, feed 185 is a live feed of data 187 as it is created by code 172, to a webpage that the SSP can access at any time. Feed at 340 can show all of the data 187 along with the timestamp of when each creative 154 was last seen or reported by one of code 134. Feed at 340 can show new creative IDs 360 that are detected in reports 166 as soon as code 172 can process the reports to get data 187. A new record or creative ID 360 can automatically show up in the feed 340 or 185 once it is discovered by code 172.

For example, at 342 a daily set of unique creative IDs 360 (e.g., with count) can be shown immediately as feed 185 with creative data 187 to SSP 301, including a timestamp 364 of the "last seen" (e.g., most recently seen) one of ID 360 and classification 367 for that creative 154 or code 302.

At 344, a continued monitor for new malicious creative IDs 180 of feed code 172 executing on device 170 monitors and sends an alert to the SSP 301 when a new creative ID number 360 is identified; and/or a continued monitor for old malicious creative IDs 181 of feed code 172 executing on device 170 monitors and sends when the same creative ID 360 is seen for two days. Monitoring and sending at 344 may include the data 187 being monitored and an alert sent to the SSP 301 when new a creative ID number 360 is identified and/or when the same creative ID 360 is seen for two days. A new creative ID 360 may indicate a new source of malicious creatives 154. The same ID 360 being seen for two days may indicate that the SSP has failed to successfully block the creative 154 for that ID 360. A period other than 2 days may be used such as 12 hours, 1 day or 3 days. The alert may be sent to the SSP by email or be an alert shown on the webpage.

At 350, the SSP 301 can pull the creative IDs 360 from feed 185 or 340 and remove creatives having those IDs from their ads so they do not get delivered to more users or site publishers by this SSP. Feed 185 or 340 can be provided to SSP 301, which poles the feed on a regular (e.g. periodic) basis and blocks the bad creatives 302 or 154 so they do not get sent by the SSP to other websites. For example, SSP 301 will know creative ID 360 of malicious creative 154 or code 302 came from malware advertiser 150 or a certain DSP (e.g., also possibly identified by DSP ID 361). Thus, after receiving feed 185 or data 187 the SSP 301 can block any creative having the ID numbers 360 reported in the feed or data from being sent in response to a call 127 for an advertisement by a publisher's 120 content 123. In some cases, the SSP 301 blocks creatives having the creative ID 360 but does not block the advertiser 150 or DSP that provided that creative (e.g., with DSP ID 361 for creative ID 360) because that advertiser can be legitimate and unknown to that advertiser can have only a few of their creatives that are malicious.

When feeding at 330 or 450 are to a DSP; then that DSP can be monitoring, pulling and/or removing at 350, 460 and/or 470, such as to pull the creative IDs 360 from feed 185 or 340 and remove creatives having those IDs from their ads so they do not get delivered to more users or site publishers by this SSP.

The add source of the creative or other malicious code source may be known by the SSP, DSP or other entity that provided malicious code. For an ad, the SSP may know which source and which ad the creative came from based on the creative ID.

Being able to receive or access feed 185 and/or 340 is very helpful to the publishers and the SSP 301 because an SSP 301 may be sending millions of ads to thousands of publishers but may not know which ads have malicious code 155. It also may take many days for the SSP to figure out which ads are malicious. Now, using system 100, code 172 and/or feed 185 it is possible for the SSP to quickly figure out which creatives are malicious creatives 154 and block them from being sent before the publishers decide that they do not want to do business with the SSP because the SSP's ads are malicious. That is, the SSP can monitor a live feed of the data 187 on feed 185 at 340, which can feed identification data of malicious creatives detected within 30, 10 or sometimes 5 minutes of detection at 230.

In some cases, 312-344 may be described as data 187 or 340. In some cases, 312-320 may be described as extracting the data 187 or 340; and 330-344 may be described as feeding data 187 or 340.

Referring now to FIG. 4 is a flow diagram of a process 400 for feeding (e.g., extracting and feeding) identification data 187 of malicious creatives 154 existing in internet advertisements to supply side platforms (SSPs). The process 400 may be or describe an operating environment in which the system 100 and/or code 172 can perform the feeding of identification data 187 to an SSP which may be intermediary 161. The process 400 may be an example of process 300; and/or executing at 240 (and optionally receiving the reporting at 235) performed by the device 170 or the executing feeding code 172 of FIG. 1C.

The environment/process 400 starts at 410 and can end at 470; but the process can also be cyclical and return to 410 after 450, 460 or 470. For example, after feeding at 450 the process may return to 410 to receive another report for each internet malicious creative 154 that is requested by a call from a protected publisher's webpage content 123 of any of various ones of the user device 110. In some cases, determining "if" a condition, occurrence or event happened in process 400 may be determining "when" that a condition, occurrence or event happened.

At 410 malicious code reports 166 of attempted unwanted actions 157 by internet advertisements promoting goods and/or services requested from SSPs 161 by protected published webpages 123 being displayed to users 110 are received from client computing devices 110 or code 134. Receiving at 410 may include descriptions for receiver 173, reporting at 235 and/or receiving at 310-312.

After 410, at 420 each malicious code report 136 of reports 166 is pre-processing to create pre-processed malicious code reports 182. Pre-processing at 420 may include descriptions for pre-processer 174, feeding at 240 and/or processing at 312.

After 420, at 430 each pre-processed malicious code report 184 of reports 182 is stored as a stored pre-processed malicious code report 194 of reports 192 and has aggregations counted in a searchable database 189 for a keep-alive period. Storing and counting at 430 may include descriptions for storer 175, storing and counting at 240 and/or at 316 (and 179).

After 430, at 440 the stored parsed pre-processed malicious code reports 192 are optionally divided into subsets of identification data 187 of unique samples of pre-processed malicious code reports 192 that are parsed based on the extracted SSP identifications 365. Dividing at 440 may include descriptions for divider 176, dividing at 240 and/or dividing at 318.

After 430 or 440, at 450 the stored parsed pre-processed malicious code reports 192 or the divided subsets of identification data 187 are feed to the SSPs or intermediary 161. Feeding at 450 may include publishing the stored "bad creative metadata" parsed pre-processed malicious code reports 192 to the SSPs that sent the creatives included in their feed. Feeding at 450 may include descriptions for feeder 177, feeding at 240 and/or feeding at 330, 340, 342, 344 and/or 350.

After 450, at 460 daily sets of the stored parsed pre-processed malicious code reports 192 or the divided subsets of identification data 187 are optionally monitored to detect a new malicious code creative identifications 360 of the extracted malicious code creatives 154; and an alert for the identification data 187 is sent to the SSP if a new malicious code creative identification is detected. Monitoring and sending at 460 may include descriptions for continued monitor for new IDs 180, monitoring and send at 240 and/or at 344.

After 450 or 460, at 470 daily sets of the stored parsed pre-processed malicious code reports 192 or the divided subsets of identification data 187 are optionally monitored to detect a malicious code creative identification 360 that exists for a period greater than 24 hours; and an alert for the identification data 187 is sent to the SSP if a malicious code creative identification 360 is detected existing for a period greater than 24 hours. Monitoring and sending at 470 may include descriptions for continued monitor for old IDs 181, monitoring and send at 240 and/or at 344.

FIG. 5 is a block diagram of a computing device 500. The computing device 500 may be representative of any of the components of system 100, such as device 110 and/or device 170. The computing device 500 may be a desktop or laptop computer, a server computer, a client computer, a network router, a network switch, a network node, a tablet, a smartphone or other mobile device. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. For example, device 170 or the components of system 100 may perform managing of feeding identification data of malicious creatives existing in internet advertisements to SSPs, using the code 171 and/or code 172.

The computing device 500 has a processor 510 coupled to a memory 512, storage 514, a network interface 516 and an I/O interface 518. The processor 510 may be or include one or more microprocessors, field programmable gate arrays (FPGAs), application specific integrated circuits (ASICs), programmable logic devices (PLDs) and programmable logic arrays (PLAs).

The memory 512 may be or include RAM, ROM, DRAM, SRAM and MRAM, and may include firmware, such as static data or fixed instructions, BIOS, system functions, configuration data, and other routines used during the operation of the computing device 500 and processor 510. The memory 512 also provides a storage area for data and instructions associated with applications and data handled by the processor 510, such as the code 171 and/or code 172. As used herein the term "memory" corresponds to the memory 512 and explicitly excludes transitory media such as signals or waveforms.

The storage 514 provides non-volatile, bulk or long-term storage of data or instructions in the computing device 500, such as code 171 and/or code 172. The storage 514 may take the form of a magnetic or solid state disk, tape, CD, DVD, or other reasonably high capacity addressable or serial storage medium. Multiple storage devices may be provided or available to the computing device 500. Some of these storage devices may be external to the computing device 500, such as network storage or cloud-based storage. As used herein, the terms "storage" and "storage medium" correspond to the storage 514 and explicitly exclude transitory media such as signals or waveforms. In some cases, such as those involving solid state memory devices, the memory 512 and storage 514 may be a single device.

The network interface 516 includes an interface to a network such as a network that can be used to communicate network packets, network messages, telephone calls, faxes, signals, streams, arrays, code 132 and/or code 171 as described herein. The network interface 516 may be wired and/or wireless.

The I/O interface 518 interfaces the processor 510 to peripherals (not shown) such as displays, video and still cameras, microphones, user input devices (e.g., touchscreens, mice, keyboards and the like) and USB devices. In some cases, the I/O interface 518 includes the peripherals, such as displays (e.g., display 113) and user input devices, for being accessed by code 134 and/or code 172 to perform any of the actions noted in FIGS. 1-4.

In some cases, storage 514 is a non-volatile machine-readable storage medium that includes all types of computer readable media, including magnetic storage media, optical storage media, and solid state storage media. It should be understood that the software can be installed in and sold with the code 132, code 171, device 110 and/or device 170 and/or the other published content or components of the system 100. Alternatively, the software can be obtained and loaded into the code 132, code 171, device 110 and/or device 170 and/or the other components of the system 100, including obtaining the software via a disc medium or from any manner of network or distribution system, including from a server owned by the software creator or from a server not owned but used by the software creator. The software can be stored on a server such as the CDN 138 or source 130 for distribution over the Internet.

Feeding of identification data 187 of malicious creatives 154 existing in internet advertisements to SSPs, using the code 171 and/or code 172 and/or the other components of the system 100 increases computer efficiency because it provide a quicker, automated and more accurate feed of data the identifies to the sending SSPs the malicious creatives they are sending in response to calls for creatives or internet advertisements as noted herein.

Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The code 171, code 172 and/or the other components of the system 100 may include a feeding of identification data 187 of malicious creatives 154 existing in internet advertisements to SSPs unit and/or a computing unit. These units may be hardware, software, firmware, or a combination thereof. Additional and fewer units, modules or other arrangement of software, hardware and data structures may be used to achieve the processes and apparatuses described herein.

Closing Comments

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for feeding identification data of malicious creatives existing in internet advertisements to ad providers, the method comprising:
   receiving at a feeding computing device from client computing devices malicious code reports of attempted unwanted actions by malicious creatives of internet advertisements (ads) sent by the ad providers to webpages being displayed to users, the internet advertisements promoting goods and/or services,
   wherein executing each malicious creative in a browser activates an unwanted action attempt by malicious code;
   each malicious code report including a malicious code creative identification, and at least one of a malicious code demand side platform (DSP) identification or a malicious code seat identification;
   pre-processing each malicious code report to create pre-processed malicious code reports by:
   storing the pre-processed malicious code reports in a searchable database, wherein storing includes:
   parsing each pre-processed malicious code report to extract the malicious code creative identification, and an ad provider identification for the malicious code;
   storing the parsed pre-processed malicious code reports in the searchable database, each parsed pre-processed malicious code report including the malicious code creative identification, the ad provider identification, and a timestamp of the unwanted action attempt; and
   feeding the stored parsed pre-processed malicious code reports to the ad providers based on the ad provider identifications of the stored parsed pre-processed malicious code reports.

2. The method of claim 1, wherein pre-processing includes:
   adding to each malicious code report, internet protocol address information of the client computing devices; and
   parsing from each malicious code report, user agent information of a type of browser of the client computing devices.

3. The method of claim 1, wherein each malicious code report includes:
   the ad provider identification of the ad provider that sent the malicious creative, a copy of malicious code programming code of each malicious creative and a malicious code chain of events that lead to the unwanted action attempt, the malicious code chain of events having the timestamp of the unwanted action attempt.

4. The method of claim 3, wherein feeding includes:
   dividing the stored parsed pre-processed malicious code reports into subsets of unique samples of the parsed pre-processed malicious code reports based on the ad provider identifications, each subset of unique samples having the parsed pre-processed malicious code reports for a single ad provider of the ad provider identifications.

5. The method of claim 4, wherein parsing each pre-processed malicious code report to extract, and dividing the stored parsed pre-processed malicious code reports includes using parsing rules to detect and extract from different data formats due to the pre-processed malicious code reports being sent by different ad providers.

6. The method of claim 1, wherein feeding includes preparing identification data for each of the ad providers by:
   dividing subsets of unique samples into daily sets of unique creatives based on the malicious code creative identifications, each unique creative having the parsed pre-processed malicious code information for a single malicious code creative identification of the malicious code creatives and a count of the number of the creatives in the information having that single malicious code creative identification.

7. The method of claim 6, wherein feeding includes displaying the identification data for each of the ad providers, the identification data showing the daily set of unique creatives.

8. The method of claim 6, further comprising:
   monitoring the daily sets of unique creatives to detect a first malicious code creative identification that is new or a second malicious code creative identification that has existed for a predetermined time period; and sending a new creative alert to a first ad provider if the first malicious code creative identification is detected; and sending an old creative alert to a second ad provider if the second malicious code creative identification that has existed for the predetermined time period is detected.

9. An apparatus comprising a non-transitory machine readable medium storing a program having instructions which when executed by a processor will cause the processor to extract and feed identification data of malicious code existing in internet advertisements to ad providers, the instructions of the program for:

receiving at a feeding computing device from client computing devices malicious code reports of attempted unwanted actions by malicious creatives of internet advertisements (ads) sent by the ad providers to webpages being displayed to users, the internet advertisements promoting goods and/or services, wherein executing each malicious creative in a browser activates an unwanted action attempt by malicious code;

each malicious code report including a malicious code creative identification, and at least one of a malicious code demand side platform (DSP) identification or a malicious code seat identification;

pre-processing each malicious code report to create pre-processed malicious code reports by:

storing the pre-processed malicious code reports in a searchable database, wherein storing includes:

parsing each pre-processed malicious code report to extract the malicious code creative identification, and an ad provider identification for the malicious code;

storing the parsed pre-processed malicious code reports in the searchable database, each parsed pre-processed malicious code report including the malicious code creative identification, the ad provider identification, and a timestamp of the unwanted action attempt; and feeding the stored parsed pre-processed malicious code reports to the ad providers based on the ad provider identifications of the stored parsed pre-processed malicious code reports.

10. The apparatus of claim 9, wherein pre-processing includes:

adding to each malicious code report, internet protocol address information of the client computing devices; and parsing from each malicious code report, user agent information of a type of browser of the client computing devices.

11. The apparatus of claim 9, wherein each malicious code report includes:

the ad provider identification of the ad provider that sent the malicious creative, a copy of malicious code programming code of each malicious creative and a malicious code chain of events that lead to the unwanted action attempt, the malicious code chain of events having the timestamp of the unwanted action attempt.

12. The apparatus of claim 11, wherein feeding includes:

dividing the stored parsed pre-processed malicious code reports into subsets of unique samples of the parsed pre-processed malicious code reports based on the ad provider identifications, each subset of unique samples having the parsed pre-processed malicious code reports for a single ad provider of the ad provider identifications.

13. The apparatus of claim 12, wherein parsing each pre-processed malicious code report to extract, and dividing the stored parsed pre-processed malicious code reports includes using parsing rules to detect and extract from different data formats due to the pre-processed malicious code reports being sent by different ad providers.

14. The apparatus of claim 9, wherein feeding includes preparing identification data for each of the ad providers by:

dividing subsets of unique samples into daily sets of unique creatives based on the malicious code creative identifications, each unique creative having the parsed pre-processed malicious code information for a single malicious code creative identification of the malicious code creatives and a count of the number of the creatives in the information having that single malicious code creative identification.

15. The apparatus of claim 14, wherein feeding includes displaying the identification data for each of the ad providers, the identification data showing the daily set of unique creatives.

16. The apparatus of claim 14, further comprising:

monitoring the daily sets of unique creatives to detect a first malicious code creative identification that is new or a second malicious code creative identification that has existed for a predetermined time period; and sending a new creative alert to a first ad provider if the first malicious code creative identification is detected; and sending an old creative alert to a second ad provider if the second malicious code creative identification that has existed for the predetermined time period is detected.

17. The apparatus of claim 9, further comprising:

a user input device a display device a processor a memory wherein the processor and the memory comprise circuits and software for performing the instructions on the storage medium.

18. A system for extracting and feeding identification data of malicious code existing in internet advertisements to ad providers, the system comprising a memory storing computer instructions that when executed by a processor include:

a receiver configured to receive from client computing devices malicious code reports of attempted unwanted actions by malicious creatives of internet advertisements (ads) sent by the ad providers to webpages being displayed to users, the internet advertisements promoting goods and/or services, wherein executing each malicious creative in a browser activates an unwanted action attempt by malicious code;

each malicious code report including a malicious code creative identification, and at least one of a malicious code demand side platform (DSP) identification or a malicious code seat identification;

a pre-processor configured to pre-process each malicious code report to create pre-processed malicious code reports by:

a storer configured to store the pre-processed malicious code reports in a searchable database, wherein storing includes:

parsing each pre-processed malicious code report to extract the malicious code creative identification, and an ad provider identification for the malicious code;

storing the parsed pre-processed malicious code reports in the searchable database, each parsed pre-processed malicious code report including the malicious code creative identification, the ad provider identification, and a timestamp of the unwanted action attempt; and a feeder configured to feed the stored parsed pre-processed malicious code reports to the ad providers based on the ad provider identifications of the stored parsed pre-processed malicious code reports.

19. The system of claim 18, wherein feeding includes preparing identification data for each of the ad providers by dividing subsets of unique samples into daily sets of unique creatives based on the malicious code creative identifications, each unique creative having the parsed pre-processed malicious code information for a single malicious code creative identification of the malicious code creatives and a count of the number of the creatives in the information having that single malicious code creative identification; and wherein feeding includes displaying the identification data for each of the ad providers, the identification data showing the daily set of unique creatives.

20. The system of claim 18 further comprising:

a user input device a display device a processor wherein the processor and the memory comprise circuits and software for performing the receiving, processing, storing and feeding.

* * * * *